United States Patent
Waldmann et al.

(10) Patent No.: US 9,332,358 B2
(45) Date of Patent: May 3, 2016

(54) METHOD FOR MONITORING USAGE OF A HEARING DEVICE

(75) Inventors: Bernd Waldmann, Maur (CH); Hans-Ueli Roeck, Hombrechtikon (CH); Michael Boretzki, Ruti (CH); Stefan Launer, Zurich (CH); Rainer Platz, Colombier (CH)

(73) Assignee: SONOVA AG, Staefa (CH)

( * ) Notice: Subject to any disclaimer, the term of this patent is extended or adjusted under 35 U.S.C. 154(b) by 128 days.

(21) Appl. No.: 14/370,559

(22) PCT Filed: Jan. 16, 2012

(86) PCT No.: PCT/EP2012/050548
§ 371 (c)(1),
(2), (4) Date: Jul. 3, 2014

(87) PCT Pub. No.: WO2013/107496
PCT Pub. Date: Jul. 25, 2013

(65) Prior Publication Data
US 2014/0341382 A1 Nov. 20, 2014

(51) Int. Cl.
*H04R 29/00* (2006.01)
*H04R 25/00* (2006.01)
*H04L 12/26* (2006.01)

(52) U.S. Cl.
CPC .......... *H04R 25/30* (2013.01); *H04L 43/0876* (2013.01); *H04R 25/558* (2013.01); *H04R 25/70* (2013.01); *H04R 2225/39* (2013.01); *H04R 2225/55* (2013.01)

(58) Field of Classification Search
None
See application file for complete search history.

(56) References Cited

U.S. PATENT DOCUMENTS

| | | | |
|---|---|---|---|
| 4,972,487 A | 11/1990 | Mangold et al. | |
| 6,785,394 B1 | 8/2004 | Olsen et al. | |
| 7,200,237 B2 | 4/2007 | Zhang et al. | |
| 7,242,777 B2 | 7/2007 | Leenen et al. | |
| 7,349,549 B2 | 3/2008 | Bachler et al. | |
| 8,842,862 B2* | 9/2014 | Weidner | 381/318 |
| 2007/0019817 A1* | 1/2007 | Siltmann | 381/60 |
| 2007/0182571 A1 | 8/2007 | Kennish | |
| 2010/0158262 A1* | 6/2010 | Schumaier et al. | 381/60 |

OTHER PUBLICATIONS

International Search Report issued in Application No. PCT/EP2012/050548 dated Nov. 7, 2012.
Written Opinion issued in Application No. PCT/EP2012/050548 dated Nov. 7, 2012.

* cited by examiner

*Primary Examiner* — Muhammad N Edun
(74) *Attorney, Agent, or Firm* — Pearne & Gordon LLP

(57) ABSTRACT

Monitoring usage of a hearing device includes: c) checking whether a message has been received within a time period (dt) shorter than a pre-defined time period (Dt) via a long-distance communication network in a remote device; and d) generating usage status data dependent on the result of the checking addressed in step c). The usage status data are indicative of the usage of the hearing device, indicating "use" if the time period (dt) is smaller than or equal to the pre-defined time period (Dt) and indicating "non-use" if the time period (dt) is larger than the pre-defined time period (Dt). The message includes identification data for identifying the hearing device or a user of said hearing device. The remote device is located remote from the hearing device and connected to the long-distance communication network. The time period (dt) starts from a start event.

16 Claims, 1 Drawing Sheet

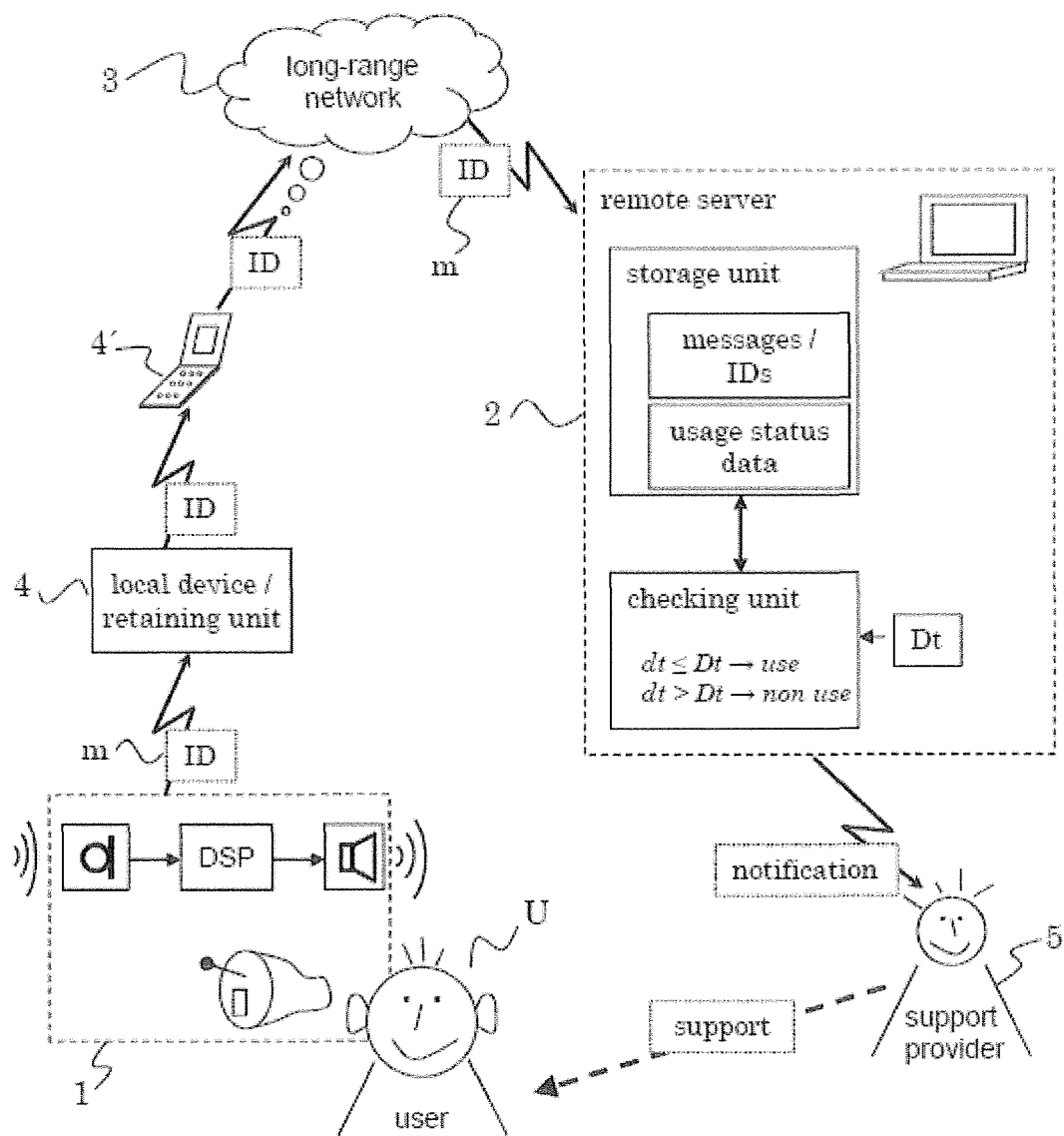

000
METHOD FOR MONITORING USAGE OF A HEARING DEVICE

TECHNICAL FIELD

The invention relates to hearing devices, more particularly to monitoring the usage of a hearing device. It relates to methods according to the opening clauses of the claims. Under a hearing device, a device is understood, which is worn in or adjacent to an individual's ear with the object to improve the individual's audiological perception. Such improvement may also be barring acoustic signals from being perceived in the sense of hearing protection for the individual. If the hearing device is tailored so as to improve the perception of a hearing impaired individual towards hearing perception of a normal-hearing individual, then we speak of a hearing-aid device. With respect to the application area, a hearing device may be applied, e.g., behind the ear, in the ear, completely in the ear canal or may be implanted.

Under audio signals we understand electrical signals, analogue and/or digital, which represent sound.

BACKGROUND OF THE INVENTION

Hearing devices are widely used. But there are cases in which an individual is provided with a hearing device, but does not use the hearing device. This situation of having but not using a hearing device is generally undesirable.

In U.S. Pat. Nos. 4,972,487, 7,242,777 and 7,349,549, data logging in hearing devices is described. Such logging data are read out of the hearing device and displayed to the hearing device fitter during a visit by the patient to the hearing device fitter's office.

U.S. Pat. No. 6,785,394 describes recording usage time of a hearing device with the purpose of determining the end of a subscription period.

U.S. Pat. No. 7,200,237 describes means for remotely upgrading a hearing device.

U.S. Pat. No. 6,785,394 describes a hearing instrument counting usage time in order to support subscription models of paying for hearing device use.

SUMMARY OF THE INVENTION

The inventors found that the undesirable situation of an individual having a hearing device not using that hearing device should be addressed. Even though in the state of the art, ways are known to determine the duration during which a hearing device has been used, this problem has not been addressed. In the state of the art, it is assumed that an individual having a hearing device does also make use of it, and if the duration of use of the hearing device is determined, this is basically done for the purpose of correctly charging the individual for the use of hearing device. The problem of "in-the-drawer" hearing devices is not considered.

But the inventors found that it is desirable to be able to monitor the usage of a hearing device aiming at detecting cases in which the individual does generally not use his hearing device.

Therefore, one object of the invention is to create a method for monitoring the usage of a hearing device.

Another object of the invention is to provide a way to detect "in-the-drawer" hearing devices.

Another object of the invention is to provide a way to detect at a relatively early point in time when an individual generally refuses to use his hearing device.

Another object of the invention is to prevent a hearing device from becoming an "in-the-drawer" hearing device.

Further objects emerge from the description and embodiments below.

At least one of these objects is at least partially achieved by methods according to the patent claims.

The method for monitoring usage of a hearing device comprises the steps of c) checking whether or not a message comprising identification data has been received within a time period shorter than a pre-defined time period via a long-distance communication network in a remote device remote from said hearing device and connected to said long-distance communication network, said time period starting from a start event, and said identification data identifying said hearing device or a user of said hearing device; and d) generating usage status data dependent on the result of said checking addressed in step c), wherein said usage status data are indicative of said usage of said hearing device, indicating "use" if said time period is smaller than said pre-defined time period and indicating "non-use" if said time period is larger than said pre-defined time period.

Slightly differently worded, one can also say: The method for monitoring usage of a hearing device comprises the steps of c') checking whether or not a message has been received via a long-distance communication network in a remote device within a time period shorter than a pre-defined time period; and d') generating usage status data dependent on the result of said checking addressed in step c);

wherein said usage status data are indicative of said usage of said hearing device, indicating "use" if said time period is smaller than said pre-defined time period and indicating "non-use" if said time period is larger than said pre-defined time period, and wherein said message comprises identification data for identifying said hearing device or a user of said hearing device, and wherein said remote device is located remote from said hearing device and connected to said long-distance communication network, and wherein said time period starts from a start event.

This allows to detect whether a hearing device can be considered to be generally in use or is rather prone to become an "in-the-drawer" hearing device.

It is possible to provide that said usage status data indicate "use" if said time period is equal to said pre-defined time period, and alternatively, it is possible to provide that said usage status data indicate "non-use" if said time period is equal to said pre-defined time period.

In one embodiment, said identifying is uniquely identifying.

In one embodiment which may be combined with the before-addressed embodiment, step c) is carried out by said remote device.

In one embodiment which may be combined with one or more of the before-addressed embodiments, step d) is carried out by said remote device.

In one embodiment which may be combined with one or more of the before-addressed embodiments, step c) is carried out automatically.

In one embodiment which may be combined with one or more of the before-addressed embodiments, step d) is carried out automatically.

In one embodiment which may be combined with one or more of the before-addressed embodiments, said remote device is or comprises a computing device, e.g., a personal computer or a server, in particular a computing device comprising or connected to a storage unit in which said usage status data and/or said message and/or said identification data from said message are stored.

In one embodiment which may be combined with one or more of the before-addressed embodiments, said remote device is or comprises a communication device, e.g., a mobile phone.

In one embodiment which may be combined with one or more of the before-addressed embodiments, said start event is the sale of said hearing device.

In one embodiment which may be combined with one or more of the before-addressed embodiments, said start event is a fitting session for fitting said hearing device to said user.

In one embodiment which may be combined with one or more of the before-addressed embodiments, said start event is the reception in said remote device of a most recent one of one or more former messages comprising identification data for identifying said hearing device or said user of said hearing device via a long-distance communication network. Note that in this case, said long-distance communication network can be, but does not have to be the same long-distance communication network as mentioned in step c).

In one embodiment which may be combined with one or more of the before-addressed embodiments, the method comprises the step of
  a) transmitting said message from said hearing device or from a local device located near said hearing device and operationally connected to said hearing device to said long-distance communication network.

In one embodiment with step a), said local device is located within 12 m, in particular within 6 m, more particularly within 1 m close to said hearing device.

Said operational connection can be a wireless connection, in particular a short-range communication connection, wherein it is possible to use proprietary communication connections or open standard communication connections such as Bluetooth, but it is also possible that said operational connection is a wire bound connection, i.e. hearing device and local device are in galvanic contact.

In one embodiment with step a) which may be combined with one or more of the before-addressed embodiments with step a), step a) is carried out automatically.

In one embodiment with step a) which may be combined with one or more of the before-addressed embodiments with step a), said local device is or comprises at least one of the group consisting of
  a communication device;
  a mobile phone;
  a dedicated communication device for communicating with said hearing device via a proprietary communication link;
  a retaining unit for overnight storing of said hearing device having communication capability.

Usually, the primary purpose of said retaining unit is desiccating the hearing device or charging a rechargeable energy storage unit comprised in the hearing device for providing the hearing device with energy.

In one embodiment with step a) which may be combined with one or more of the before-addressed embodiments with step a), said transmission addressed in step a) is initiated by said hearing device in pre-determined time intervals while the hearing device is switched on, in particular wherein said time intervals are smaller than said pre-determined time period.

In one embodiment with step a) which may be combined with one or more of the before-addressed embodiments with step a), said transmission addressed in step a) is initiated by said hearing device in reaction to a turning on of said hearing device.

In one embodiment with step a) which may be combined with one or more of the before-addressed embodiments with step a), said transmission addressed in step a) is initiated by said hearing device in reaction to a turning off of said hearing device.

In one embodiment with step a) which may be combined with one or more of the before-addressed embodiments with step a), said transmission addressed in step a) is initiated by said hearing device in reaction to inserting said hearing device into a retaining unit for overnight storing of said hearing device.

In one embodiment with step a) which may be combined with one or more of the before-addressed embodiments with step a), said transmission addressed in step a) is initiated by said hearing device in reaction to removing said hearing device from a retaining unit for overnight storing of said hearing device.

In one embodiment with step a) which may be combined with one or more of the before-addressed embodiments with step a), said transmission addressed in step a) is initiated by a retaining unit for overnight storing of said hearing device in reaction to inserting said hearing device into said retaining unit.

In one embodiment with step a) which may be combined with one or more of the before-addressed embodiments with step a), said transmission addressed in step a) is initiated by a retaining unit for overnight storing of said hearing device in reaction to removing said hearing device from said retaining unit.

In one embodiment which may be combined with one or more of the before-addressed embodiments, said pre-defined time period is between one day and 6 days, more particularly between 1.5 days and 4 days, even more particularly between 2 days and 4 days.

In one embodiment which may be combined with one or more of the before-addressed embodiments, the method comprises the step of
  b) receiving said message in said remote device via said long-distance communication network.

In one embodiment which may be combined with one or more of the before-addressed embodiments, the method comprises the step of
  e) informing a party or person different from said user about said result of said checking if said usage status data indicate "non-use".

E.g., step e) comprises sending a notification to said party or person, e.g., an e-mail, an SMS or a tweet.

In one embodiment with step e), step e) is carried out by said remote device.

In one embodiment with step e) which may be combined with the before-addressed embodiment with step e), step e) is carried out automatically.

In one embodiment with step e) which may be combined with one or more of the before-addressed embodiments with step e), the method comprises the step of
  f) said party or person attempting to get into contact with said hearing device user in reaction to being informed according to step e).

In one embodiment with step e) which may be combined with one or more of the before-addressed embodiments with step e), said party or person is related to said hearing device or to said user, in particular wherein said party or person is personally acquainted to said user, and/or said party or person is a professional caregiver.

In one embodiment with step e) which may be combined with one or more of the before-addressed embodiments with step e), said party or person is or comprises a hearing device professional, and said method comprises the step of g) offering to said user support concerning the use and/or operation of said hearing device.

In one embodiment with step e) which may be combined with one or more of the before-addressed embodiments with step e), said party or person is or comprises a hearing device professional, and said method comprises the step of h) trying to make an appointment with said user.

Note that a hearing device professional can be, e.g., a hearing device fitter, an audiologist, an employee of hearing device manufacturer.

In one embodiment referring to the before-addressed embodiment, the method is a method for providing support for a hearing device user concerning the use and/or the operation of a hearing device.

In one embodiment with step e) which may be combined with one or more of the before-addressed embodiments with step e), said party or person is or comprises a relative of said user or a care taker, and said method comprises the step of i) checking whether said user is doing fine.

Said care taker can be, e.g., a nurse.

In one embodiment referring to the before-addressed embodiment, the method is a method for surveying the well-being of a user of a hearing device.

In one embodiment with step e) which may be combined with one or more of the before-addressed embodiments with step e), said party or person is a reimbursement provider for reimbursing costs of or related to hearing devices or a person employed by such a reimbursement provider.

Such a reimbursement provider can be, e.g., an insurance.

In one embodiment which may be combined with one or more of the before-addressed embodiments, said usage status data are generated only if said time period is larger than said pre-defined time period, or only if said time period is larger than or equal to said pre-defined time period.

In one embodiment which may be combined with one or more of the before-addressed embodiments except for the last-addressed embodiment, said usage status data are generated only if said time period is smaller than said pre-defined time period, or only if said time period is smaller than or equal to said pre-defined time period.

In one embodiment which may be combined with one or more of the before-addressed embodiments, said hearing device is a hearing-aid device.

Further embodiments and advantages emerge from the dependent claims and the figures.

BRIEF DESCRIPTION OF THE DRAWING

Below, the invention is described in more detail by means of examples and the included drawing. The FIGURE shows:

FIG. 1 a schematic illustration of a method according to the invention.

The reference symbols used in the figure and their meaning are summarized in the list of reference symbols. The described embodiments are meant as examples and shall not confine the invention.

DETAILED DESCRIPTION OF THE INVENTION

FIG. 1 shows a schematic illustration of a method according to the invention. A user U has a hearing device 1. The hearing device 1 has an input converter, such as a microphone, for deriving audio signals from sound, a signal processing unit, such as a DSP chip, for processing said audio signals, and an output converter, such as a loudspeaker, for deriving signals to be perceived by said user U, such as sound (sound waves), from the processed audio signals.

The hearing device 1 transmits a message m containing identification data ID, such as the serial number of the hearing device or a client number of the user U. Via a local device 4 operationally connected to the hearing device 1, such as a hearing device overnight retainer, and via another local device 4', such as a mobile phone, the message m is transmitted to a long-range communication network 3 in order to be transmitted to a remote device 2 located remote from hearing device 1. E.g., said message is sent when hearing device 1 is inserted into or removed from said hearing device overnight retainer.

Remote device 2 is, e.g., a remote server or remote computer. In a checking unit of remote device 2, it is checked whether or not the message m has been received in remote device 2 at a time which is considered to indicate that the hearing device 1 is in use, wherein in the latter case, the hearing device is considered to be not in use. More precisely, it is checked whether the time period up to the reception of the message m in remote device 2 is so short that this is taken as an indication for the hearing device 1 being (generally) in use, wherein this is accomplished, e.g., by comparing the length of a time period dt starting with a start event and ending with the reception of message m in remote device 2 with a pre-determined time period Dt. If dt>Dt is detected, it is assumed that the hearing device 1 is not in use.

Such a start event can be, e.g., the selling of the hearing device 1 or a hearing device fitting session the user U has with his hearing health care professional. But the start event can also be the reception of a former message like the message m in remote device 2. In that case, it is, e.g., possible to provide that hearing device 1 periodically sends messages m, such as each time after it has accumulated a switched-on time of more than 6 hours, and if no such message m has been received for a certain time, e.g., for 48 hours, e.g., as found out by each time checking 48 hours after the reception of the respective most recent message, it is detected that dt>Dt (Dt=48 hours).

Corresponding usage status data indicative of either "use" or "non-use" can be generated and stored in remote device 2.

If "non-use" has been found, the remote device can try to communicate the a party or person 5, e.g., sending a notification, such as an e-mail or an SMS. Party or person 5 can be, e.g., the user's hearing health care provider or a person associated with the manufacturer of the hearing device 1, or a person personally related to the user U such as a relative or a caregiver.

Party or person 5 can try to contact the user U in response to such a notification and/or try to provide the user with help or support.

The method can be used for avoiding "in the drawer" hearing devices by way of relatively early contacting user U when it shows up (namely by way of the reception of a notification from remote device 2) that the hearing device is not switched on for a long time such as for several days.

The method can also be used for monitoring the well-being of user U, namely under the assumption that the user U is not doing well when he does not use his hearing device 1 for an abnormally long time. Trying to reach or visit user U in response to the reception of a notification from remote device 2 can thus help to maintain or check the user's health.

The method can also be used in conjunction with asking back all or a part of the money a reimbursement provider such as an insurance has paid in conjunction with hearing device 1, namely in case user U does not actually use the hearing device 1, as detected by means of the above-described method.

LIST OF REFERENCE SYMBOLS 1 hearing device
2 remote device, computing device, communication device
3 long-distance communication network
4,4' device, local device, communication device, overnight retaining unit
5 party, person, hearing device professional
dt time period
Dt time period, pre-defined time period
ID identification data
m message
U user, hearing device user

What is claimed is:

1. A method for monitoring usage of a hearing device (1), said method comprising the steps of
   c) checking whether or not a message (m) comprising identification data (ID) has been received within a time period (dt) shorter than a pre-defined time period (Dt) via a long-distance communication network (3) in a remote device (2) remote from said hearing device (1) and connected to said long-distance communication network (3), said time period (dt) starting from a start event, and said identification data (ID) identifying said hearing device (1) or a user (U) of said hearing device (1); and
   d) generating usage status data dependent on the result of said checking addressed in step c), wherein said usage status data are indicative of said usage of said hearing device (1), indicating "use" if said time period (dt) is smaller than said pre-defined time period (Dt) and indicating "non-use" if said time period (dt) is larger than said pre-defined time period (Dt).

2. The method according to claim 1, wherein said start event is one of the group comprising
   the sale of said hearing device;
   a fitting session for fitting said hearing device (1) to said user (U);
   the reception in said remote device (2) of a most recent one of one or more former messages comprising identification data (ID) for identifying said hearing device (1) or said user (U) of said hearing device (1) via a long-distance communication network (3).

3. The method according to claim 1, further comprising the step of
   a) transmitting said message (m) from said hearing device (1) or from a local device (4;4') located near said hearing device (1) and operationally connected to said hearing device (1) to said long-distance communication network (3).

4. The method according to claim 3, wherein said local device (4;4') is or comprises at least one of the group consisting of
   a communication device;
   a mobile phone;
   a dedicated communication device for communicating with said hearing device (1) via a proprietary communication link;
   a retaining unit for overnight storing of said hearing device (1) having communication capability.

5. The method according to claim 3, wherein said transmission addressed in step a) is initiated by said hearing device (1)
   in pre-determined time intervals while the hearing device is switched on; and/or
   in reaction to a turning on and/or a turning off of said hearing device (1); and/or
   in reaction to inserting said hearing device (1) into and/or removing said hearing device (1) from a retaining unit for overnight storing of said hearing device (1);
   and/or is initiated by a retaining unit for overnight storing of said hearing device (1) in reaction to inserting said hearing device (1) into and/or removing said hearing device (1) from said retaining unit.

6. The method according to claim 1, wherein said pre-defined time period (Dt) is between one day and 6 days, more particularly between 1.5 days and 4 days.

7. The method according to claim 1, further comprising the step of
   b) receiving said message (m) in said remote device (2) via said long-distance communication network (3).

8. The method according to claim 1, further comprising the step of
   e) informing a party or person (5) different from said user about said result of said checking if said usage status data indicate "non-use".

9. The method according to claim 8, further comprising the step of
   f) said party or person (5) attempting to get into contact with said hearing device user (U) in reaction to being informed according to step e).

10. The method according to claim 8, wherein said party or person (5) is related to said hearing device (1) or to said user (U).

11. The method according to claim 8, wherein said party or person (5) is or comprises a hearing device professional, said method comprising at least one of the steps of
    g) offering to said user (U) support concerning the use and/or operation of said hearing device (1);
    h) trying to make an appointment with said user (U).

12. The method according to claim 11, wherein the method is a method for providing support for a hearing device user (U) concerning the use and/or the operation of a hearing device (1).

13. The method according to claim 8, wherein said party or person (5) is or comprises a relative of said user (U) or a care taker, said method comprising the step of
    i) checking whether said user (U) is doing fine.

14. The method according to claim 13, wherein the method is a method for surveying the well-being of a user (U) of a hearing device (1).

15. The method according to claim 8, wherein said party or person (5) is a reimbursement provider for reimbursing costs of or related to hearing devices or a person employed by such a reimbursement provider.

16. The method according to claim 1, wherein said usage status data are generated only if said time period (dt) is larger than said pre-defined time period (Dt), or wherein said usage status data are generated only if said time period (dt) is smaller than or equal to said pre-defined time period (Dt).

* * * * *